(12) United States Patent
Chen et al.

(10) Patent No.: US 11,481,063 B2
(45) Date of Patent: Oct. 25, 2022

(54) TOUCH DRIVING DEVICE AND TOUCH MOVEMENT TRACK IDENTIFICATION METHOD

(71) Applicant: Novatek Microelectronics Corp., Hsinchu (TW)

(72) Inventors: Li-Hsin Chen, Changhua County (TW); Chin-Lin Lee, Tainan (TW); Hsiang-Cheng Yu, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 93 days.

(21) Appl. No.: 17/037,747

(22) Filed: Sep. 30, 2020

(65) Prior Publication Data

US 2021/0109634 A1 Apr. 15, 2021

Related U.S. Application Data

(60) Provisional application No. 62/912,657, filed on Oct. 9, 2019.

(51) Int. Cl.
*G06F 3/041* (2006.01)
*G06F 3/04883* (2022.01)

(52) U.S. Cl.
CPC ........ *G06F 3/04162* (2019.05); *G06F 3/0412* (2013.01); *G06F 3/0414* (2013.01); *G06F 3/04883* (2013.01)

(58) Field of Classification Search
CPC .. G06F 3/04162; G06F 3/0412; G06F 3/0414; G06F 3/04883; G06F 1/1643;

(Continued)

(56) References Cited

U.S. PATENT DOCUMENTS 4,718,103 A * 1/1988 Shojima ............... G06V 10/754
382/241
9,229,624 B2 1/2016 Wei et al.
(Continued)

FOREIGN PATENT DOCUMENTS

CN 102103693 6/2011
TW 201530413 8/2015
(Continued)

OTHER PUBLICATIONS

"Office Action of Taiwan Counterpart Application", dated Nov. 25, 2021, p. 1-p. 8.

*Primary Examiner* — Temesghen Ghebretinsae
*Assistant Examiner* — Ivelisse Martinez Quiles
(74) *Attorney, Agent, or Firm* — JCIPRNET (57) ABSTRACT

A touch driving device and a touch movement track identification method are provided. The touch driving device includes a touch sensing circuit and a touch control circuit. The touch sensing circuit receives touch sensing signals from a touch sensor array when a touch display screen is operated in a display power saving mode, and generates digital touch sensing data according to the touch sensing signals. The touch control circuit periodically generates touch coordinates according to the digital touch sensing data, identifies whether an input symbol corresponding to a touch movement track formed by the touch coordinates generated consecutively matches a preconfigured symbol, and outputs a matching result to a core processing unit of the electronic device. The touch coordinates are generated when the orientation of the input symbol drawn on the touch display screen is not the same as a screen orientation of the touch display screen.

19 Claims, 6 Drawing Sheets

(58) Field of Classification Search
CPC .... G06F 1/3215; G06F 1/3265; G06F 1/3287; G06F 1/3293; G06F 21/31; G06F 1/1626; G06F 3/0416; Y02D 10/00; G06V 30/1423; G06V 30/32; G06V 40/28
See application file for complete search history.

(56) References Cited

U.S. PATENT DOCUMENTS

| | | |
|---|---|---|
| 10,613,654 B2 | 4/2020 | Chin et al. |
| 2012/0007713 A1 | 1/2012 | Nasiri et al. |
| 2013/0106728 A1 | 5/2013 | Ohta |
| 2013/0120464 A1 | 5/2013 | Wei et al. |
| 2015/0035765 A1* | 2/2015 | Hirabayashi ........ G06F 3/04883 345/173 |
| 2015/0186034 A1* | 7/2015 | Li .......................... G06V 30/32 345/173 |
| 2016/0155426 A1 | 6/2016 | Gunn et al. |
| 2017/0102758 A1* | 4/2017 | Siaw ....................... G06F 3/017 |
| 2019/0094998 A1 | 3/2019 | Chin et al. |

FOREIGN PATENT DOCUMENTS

| | | |
|---|---|---|
| TW | 201610822 | 3/2016 |
| TW | I571790 | 2/2017 |
| TW | 201915678 | 4/2019 |

\* cited by examiner

TOUCH DRIVING DEVICE AND TOUCH MOVEMENT TRACK IDENTIFICATION METHOD

CROSS-REFERENCE TO RELATED APPLICATION

This application claims the priority benefit of Taiwan application Ser. No. 62/912,657, filed on Oct. 9, 2019. The entirety of the above-mentioned patent application is hereby incorporated by reference herein and made a part of this specification.

BACKGROUND

Technical Field

The disclosure relates to a driving device and an identification method, and particularly relates to a touch driving device and a touch movement track identification method.

Description of Related Art

For a general electronic device with touch sensing function, when the electronic device is operating in sleep mode, the user can wake up an operating system of the electronic device to control an application such as a flashlight function or a music playing function, by pressing an power key or a key combination or by handwrite-inputting various specific characters or symbols on a touch display screen of the electronic device. However, there are still limitations in the operation method that the written character is the letter. The written character must be in the same orientation as the touch display screen and not skewed, otherwise the written character cannot be identified.

Figure 1A:
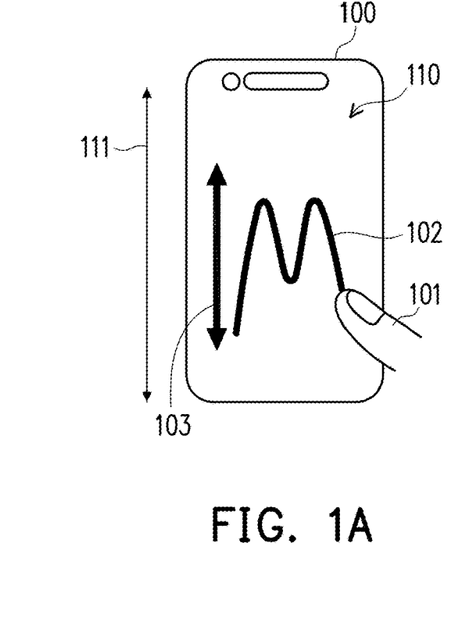
FIG. 1A to FIG. 1C are schematic diagrams showing multiple operation situations of touch movement track identification.
Figure 1B:
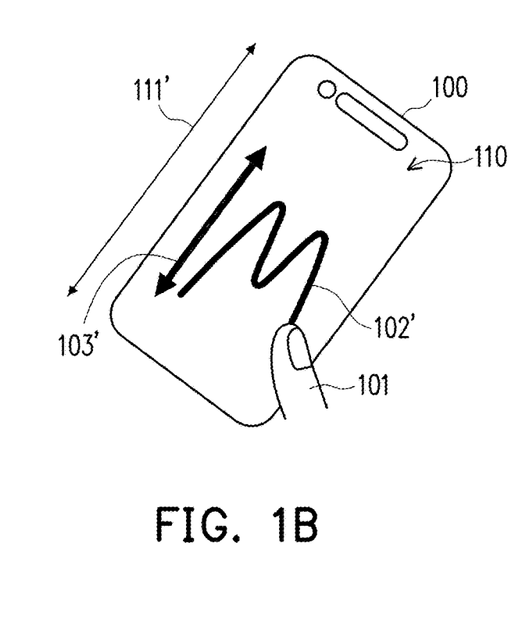
Figure 1C:
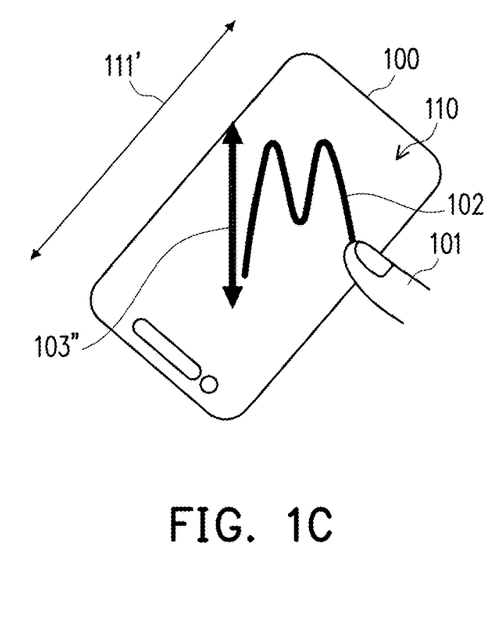

FIG. 1A to FIG. 1C are schematic diagrams showing multiple operation situations of touch movement track identification. For example, referring to FIG. 1A, the user's finger 101 may touch a touch display screen 110 of an electronic device 100 to write a character 102 formed by the touch movement track in a condition that the electronic device 100 is placed such that the touch display screen 110 is in a vertical orientation 111 (often called portrait orientation). In such as case, an orientation 103 of the character 102 is parallel to the vertical orientation 111 of the touch display screen 110, and the character 102 can be successfully identified by the electronic device 100. Referring to FIG. 1B, the user's finger 101 may write the character 102' in a condition that the electronic device 100 is rotated such that an orientation 111' of the touch display screen 110 is neither the vertical direction nor a horizontal orientation (often called landscape orientation). When the orientation 111' of the touch display screen 110 and the orientation 103' of the character 102' are changed by the same angle of rotation, the character 102' still can be successfully identified by the electronic device 100.

However, referring to FIG. 1C, in a condition that the user's finger 101 writes the character 102 in the vertical direction 103 (same as the portrait orientation of the touch display screen 110, shown in FIG. 1A), but the touch display screen 110 is placed in the orientation 111' as in FIG. 1B, the character 102 will not be successfully identified by the electronic device 100. Thus, the electronic device 100 cannot provide a convenient shortcut to start a desired application when an orientation of a touch-writing input character and the screen orientation are not the same under the sleep mode. Therefore, a new touch driving device having the convenient identification function are provided below.

SUMMARY

The disclosure is directed to a touch driving device and a touch movement track identification method, and are capable of performing effective touch movement track identification.

The touch driving device for driving a touch sensor array of a touch display screen of an electronic device of the disclosure includes a touch sensing circuit and a touch control circuit. The touch sensing circuit is configured to receive a plurality of touch sensing signals from the touch sensor array when the touch display screen is operated in a display power saving mode, and generate a plurality of digital touch sensing data according to the plurality of touch sensing signals. The touch control circuit is coupled to the touch sensing circuit. The touch control circuit is configured to periodically generate a plurality of touch coordinates according to the plurality of digital touch sensing data, identify whether an input symbol corresponding to a touch movement track formed by the plurality of touch coordinates generated consecutively matches a preconfigured symbol, and output a matching result to a core processing unit of the electronic device. The plurality of touch coordinates are generated when the orientation of the input symbol drawn on the touch display screen is not the same as a screen orientation of the touch display screen.

The touch movement track identification method of the disclosure includes the following steps: receiving a plurality of touch sensing signals from a touch sensor array when a touch display screen is operated in a display power saving mode; generating a plurality of digital touch sensing data according to the plurality of touch sensing signals; periodically generating a plurality of touch coordinates according to the plurality of digital touch sensing data; identifying whether an input symbol corresponding to a touch movement track formed by the plurality of touch coordinates generated consecutively matches a preconfigured symbol; and outputting a matching result to a core processing unit of an electronic device. The plurality of touch coordinates are generated when the orientation of the input symbol drawn on the touch display screen is not the same as a screen orientation of the touch display screen.

Based on the above, according to the touch driving device and the touch movement track identification method of the disclosure, the touch driving device can effectively identify the touch movement track even the orientation of the input symbol form by the touch movement track is not the same as the screen orientation of the touch display screen.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 2:
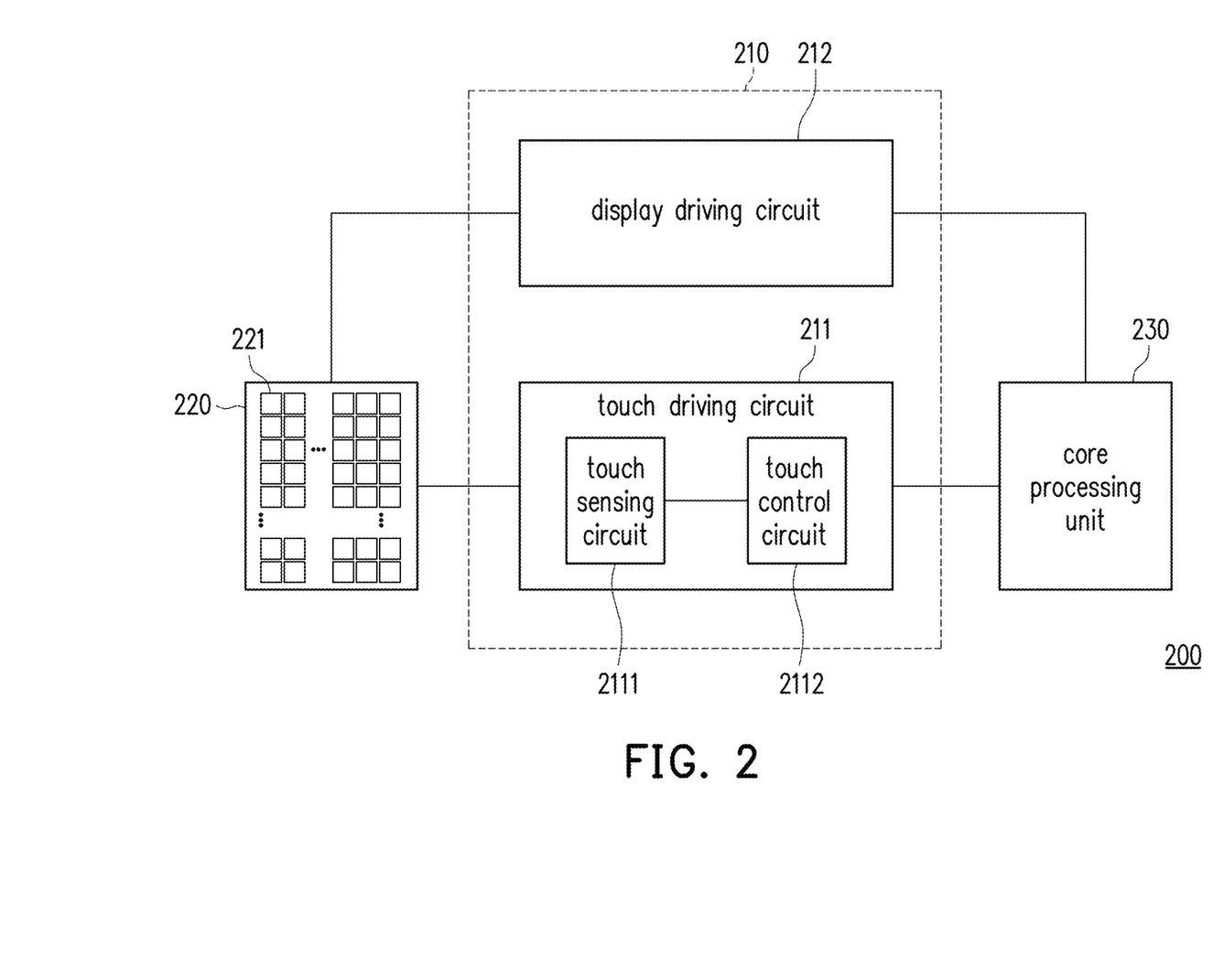
FIG. 2 is a schematic diagram illustrating an electronic device according to an embodiment of the disclosure.

FIG. 2 is a schematic diagram illustrating an electronic device according to an embodiment of the disclosure. Referring to FIG. 2, an electronic device 200 includes a touch driving device 210, a touch display screen 220, and a core processing unit 230. The touch display screen 220 includes a touch sensor array 221. The touch driving device 210 is coupled to the touch display screen 230 and a core processing unit 240. In the embodiment of the disclosure, the touch driving device 210 includes a touch driving circuit 211 and a display driving circuit 212. The touch driving circuit 211 may drive and sense a plurality of touch sensors of the touch sensor array 221, and may provide a sensing result (such as touch coordinate) to the core processing unit 230. The touch driving circuit 211 includes a touch sensing circuit 2111 and a touch control circuit 2112, where the touch sensing circuit 2111 is coupled to the touch control circuit 2112. The touch sensing circuit 2111 may further include an analog-front-end (AFE) circuit and an analog-to-digital converter (ADC) circuit for converting the analog touch sensing signals to the digital touch sensing data. The display driving circuit 212 is coupled to the touch display screen 220 and the core processing unit 230. The display driving circuit 212 may receive display data and control signal from the core processing unit 230, and may drive a plurality of display pixels of the touch display screen 220 according to the display data and the control signal.

In the present embodiment, the electronic device 200 may be a hand-held mobile device such as a mobile phone or tablet computer. The core processing unit 230 and the touch driving device 210 may be separate integrated circuits (ICs). For example, the core processing unit 230 may be a central processing unit (CPU), an application processor (AP), a general or specific purpose programmable microprocessor, a digital signal processor (DSP), a programmable controller, an application specific integrated circuit (ASIC), and so on. In one embodiment, the touch driving device 210 may be a touch and display driver integration (TDDI) circuit implemented as an IC. In another embodiment, the touch driving circuit 211 and the display driving circuit 212 are implemented as separate ICs. In the present embodiment, the touch driving device 210 is capable of identifying a touch movement track on the touch display screen 220 when the touch display screen 220 is operated in a display power saving mode and the core processing unit 230 of the electronic device 200 is also operated in a sleep mode. The display power saving mode means that the touch display screen 220 does not display data based on a regular or reduced refresh rate so the touch display screen 220 looks like a dark screen, or the touch display screen 220 operates in an always-on display (AOD) mode which may allow to display only pre-stored images. If the touch driving device 210 determines that an input symbol corresponding to the touch movement track passes the identification, the touch driving device 210 outputs an identification result to the core processing unit 230, so that the core processing unit 230 may be waked up to operate related applications according to the identification result.

Figure 3:
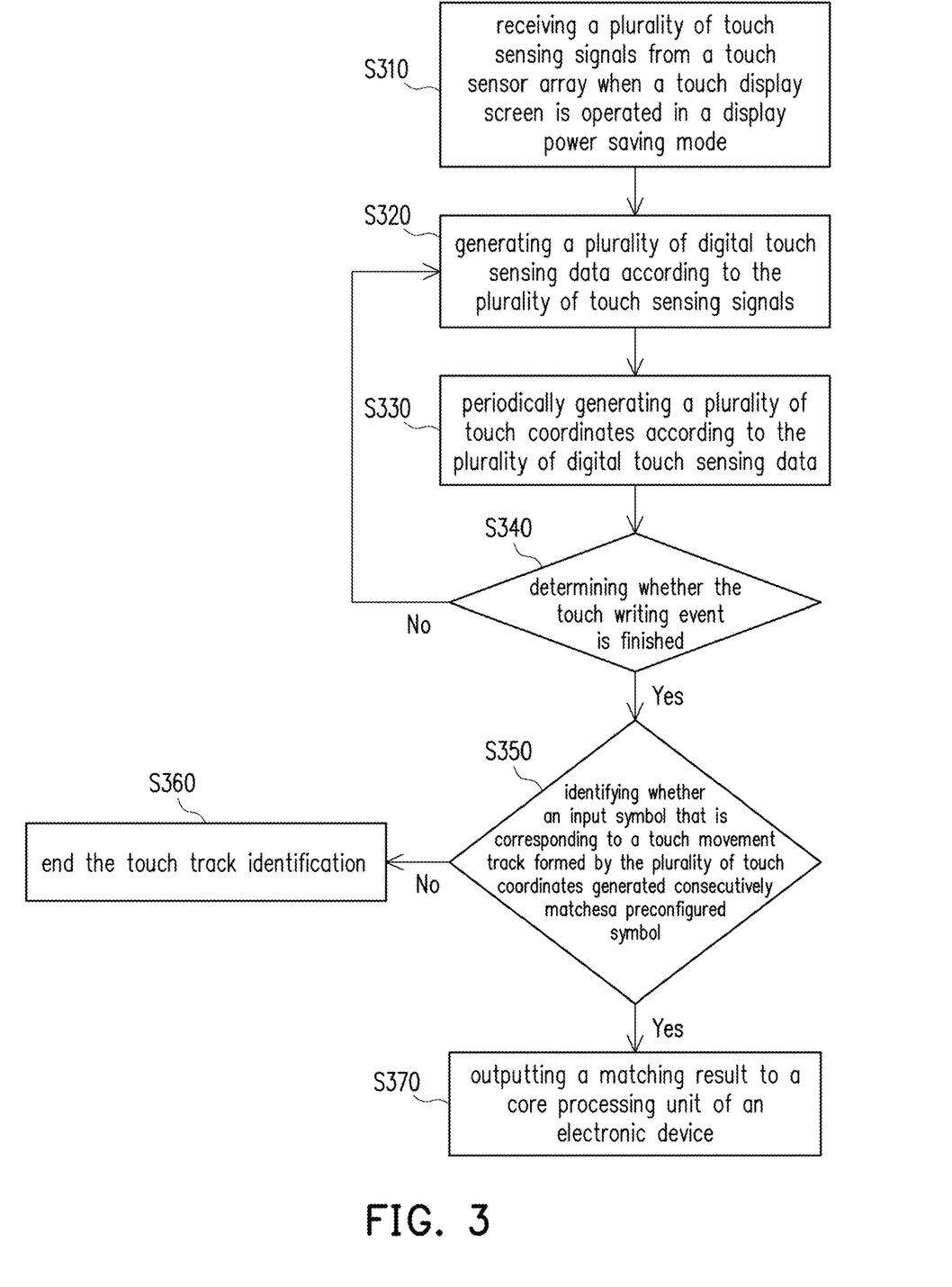
FIG. 3 is a flow chart illustrating a touch movement track identification method according to an embodiment of the disclosure.

FIG. 3 is a flow chart illustrating a touch movement track identification method according to an embodiment of the disclosure. Referring to FIG. 2 and FIG. 3, the electronic device 200 may execute the steps S310 to S370 to perform the touch movement track identification. In the present embodiment, during the touch display screen 220 operating in the display power saving mode, the touch display screen 220 does not display any image or displays only pre-stored images at the display power saving mode. In the present embodiment, during the touch display screen 220 operating in the display power saving mode, when the touch display screen 220 is touched by, for example, the user's finger or an active pen to perform a touch writing event, the touch driving device 210 is changed to operate in an identification mode. The touch writing event is corresponded to one continuous touch action of the user's finger or the active pen. In step S310, the touch sensing circuit 2111 receives a plurality of touch sensing signals from the touch sensor array 221. In step S320, the touch sensing circuit 2111 generates a plurality of digital touch sensing data according to the plurality of touch sensing signals to the touch control circuit 2112. In step S330, the touch control circuit 2112 periodically generates a plurality of touch coordinates according to the plurality of digital touch sensing data, and records the plurality of touch coordinates.

In step S340, the touch control circuit 2112 determines whether the touch writing event is finished. If no, the electronic device 200 continuously executes step S320. If yes, the electronic device 200 executes step S350. In step S350, the touch control circuit 2112 identifies whether an input symbol corresponding to a touch movement track formed by the plurality of touch coordinates generated consecutively matches a preconfigured symbol. The input symbol is composed of a plurality of continuous strokes. If no, the electronic device 200 executes step S360 to end the touch movement track identification. If yes, the touch control circuit 2112 executes step S370. In step S370, the touch control circuit 2112 outputs a matching result to the core processing unit 230 of the electronic device 200. It should be noted that, the plurality of touch coordinates may be generated even the orientation of the input symbol drawn on the touch display screen 220 is not the same as a screen orientation of the touch display screen 220. In other words, the electronic device 200 can effectively identify the touch movement track even the orientation of the input symbol drawn on the touch display screen 220 is not the same as the screen orientation of the touch display screen 220. Furthermore, the following embodiments will further explain the identification methods of the touch movement track which is step S350 of this disclosure.

Figure 4:
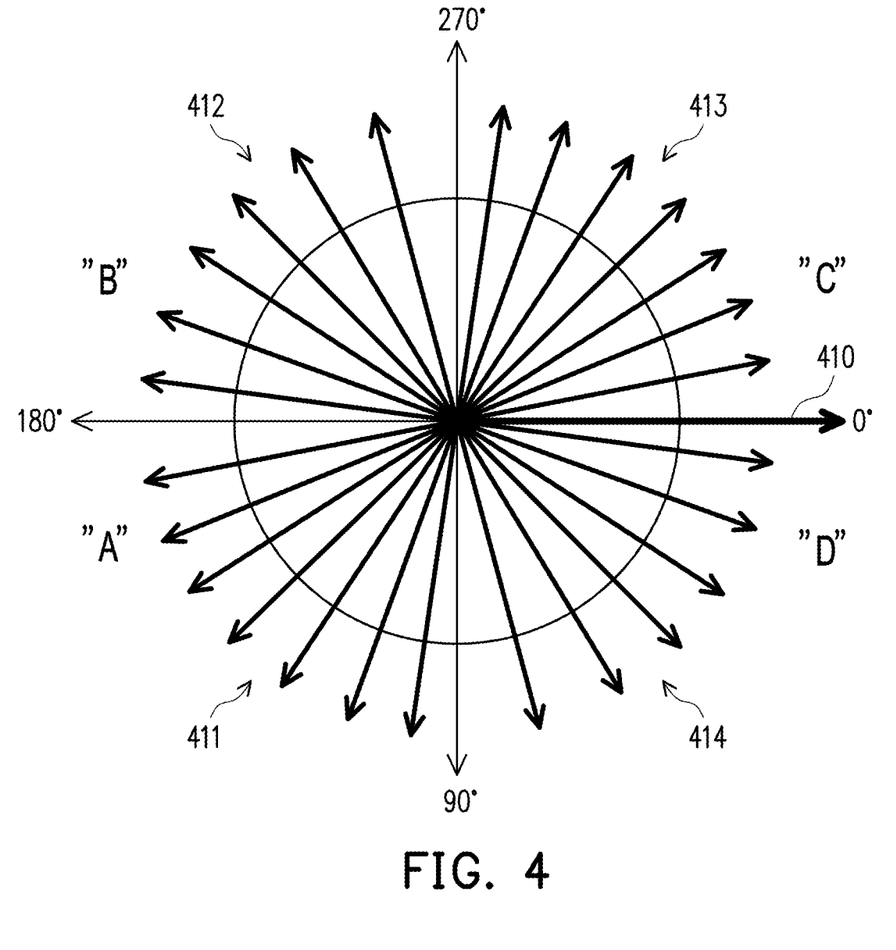
FIG. 4 is a schematic diagram illustrating a plurality of motion direction ranges corresponding to multiple codes according to an embodiment of the disclosure.
Figure 5:
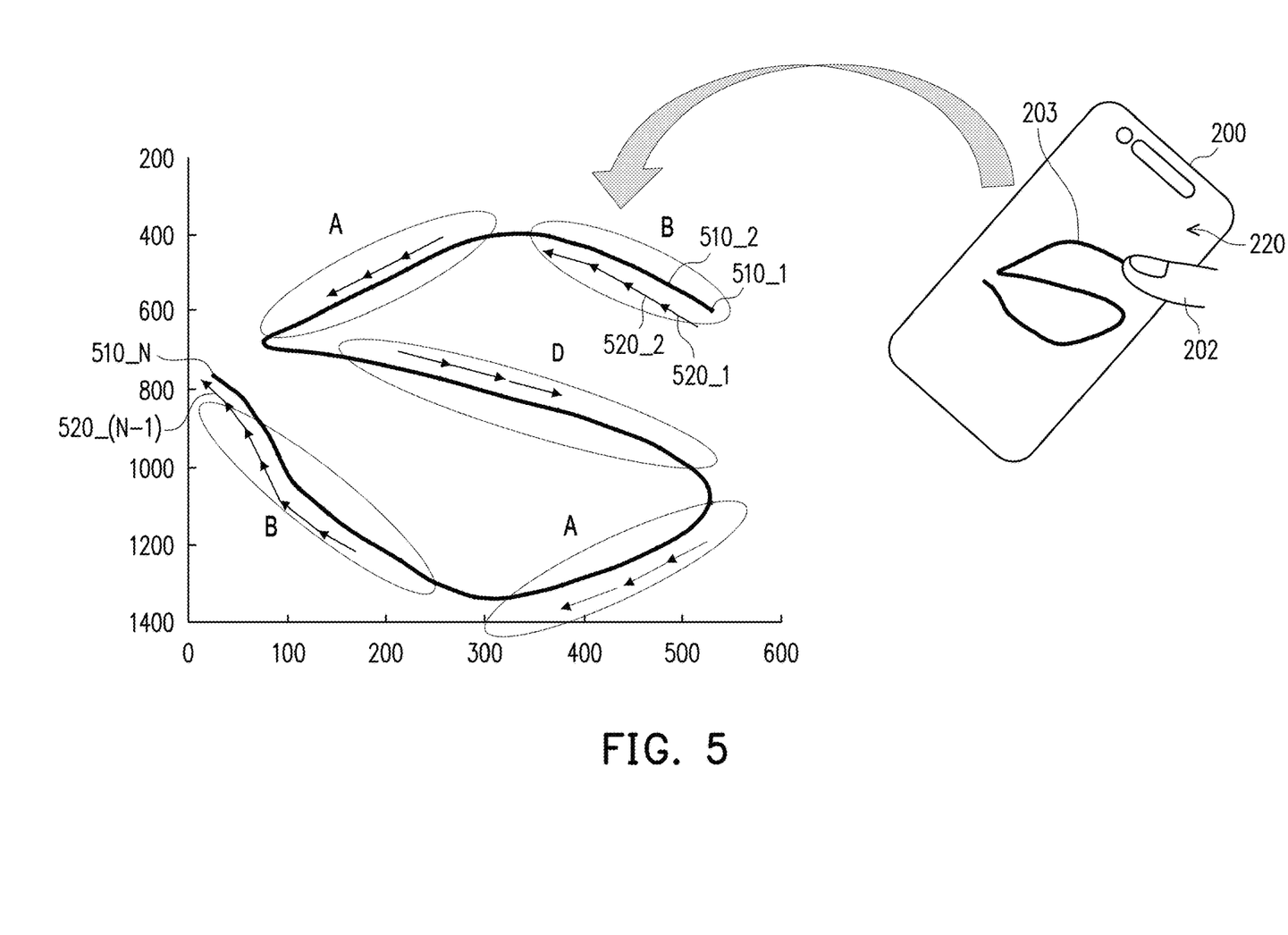
FIG. 5 is a schematic diagram illustrating a touch movement track according to an embodiment of the disclosure.

FIG. 4 is a schematic diagram illustrating a plurality of motion direction ranges corresponding to multiple codes according to an embodiment of the disclosure. The electronic device 200 may predetermine a plurality of motion direction ranges by average dividing 360 degrees, which can cover any direction of a vector between every two time-adjacent touch coordinates in a touch movement track. Referring to the embodiments in FIG. 2 and FIG. 4, the electronic device 200 may predetermine four motion direction ranges 411 to 414, where the motion direction ranges 411 to 414 are determined by clockwise direction about a reference axis 410 defined as zero degree, which is a horizontal axis toward right in this embodiment. The motion direction ranges 411 to 414 may be denoted by respective codes "A" to "D", where each code represents a range of a motion direction that a vector may fall in. The reference range 411 is corresponded to a range of 90 degrees to 180 degrees clockwise about the reference axis 410, and the electronic device 200 sets a code "A" to represent the reference range 411. The reference range 412 is corresponded to a range of 180 degrees to 270 degrees clockwise about the reference axis 410, and the electronic device 200 sets a code "B" to represent the reference range 412. The reference range 413 is corresponded to a range of 270 degrees to 360 degrees clockwise about the reference axis 410, and the electronic device 200 sets a code "C" to represent the reference range 413. The reference range 414 is corresponded to a range of 0 degrees to 90 degrees clockwise about the reference axis 410, and the electronic device 200 sets a code "D" to represent the reference range 414. The present disclose does not limit the number of motion direction ranges to be four, and the number of motion direction ranges may be predetermined to be less or more based on the quantity and the complexity of the preconfigured symbols, as long as the precision of input symbol identification meets the requirement. FIG. 5 is a schematic diagram illustrating a touch movement track according to an embodiment of the disclosure. Referring to FIG. 5, similar to FIG. 1C, the orientation of the input symbol as a letter "S" drawn on the touch display screen 220 by the user's finger 202 is not the same as a screen orientation of the touch display screen 220, where the coordinate system of FIG. 5 corresponds to the vertical screen orientation and the horizontal screen orientation of the touch display screen 220. Referring to FIG. 2 to FIG. 5, when a user's finger 202 touching the touch display screen 220 to perform the touch writing event, in response to the touch writing event, the touch control circuit 2112 records a plurality of touch coordinates 510_1 to 510_N to form the touch movement track 203, where N is a positive integer. The touch movement track 203 may correspond to the input symbol "S", where the input symbol is composed of a plurality of continuous strokes. The touch control circuit 2112 obtains a plurality of vectors 520_1 to 520_(N−1) according to each two time-adjacent touch coordinates of the plurality of touch coordinates 510_1 to 510_N. Then, the touch control circuit 2112 converts each of the plurality of vectors 520_1 to 520_(N−1) to a code according to the direction of the each vector and the angle between the each vector and a reference axis, where each code are selected from a plurality of candidate codes as "A" to "D" of FIG. 4 representing different motion direction ranges. Hence, as shown in FIG. 4, the touch control circuit 2112 may generate a first code sequence corresponding to the touch movement track 203, and the first code sequence may be described as "BBBBAAA . . . AADDD . . . DDAAA . . . AABBB" based on the plurality of vectors 520_1 to 520_(N−1) of FIG. 5.

Figure 6:
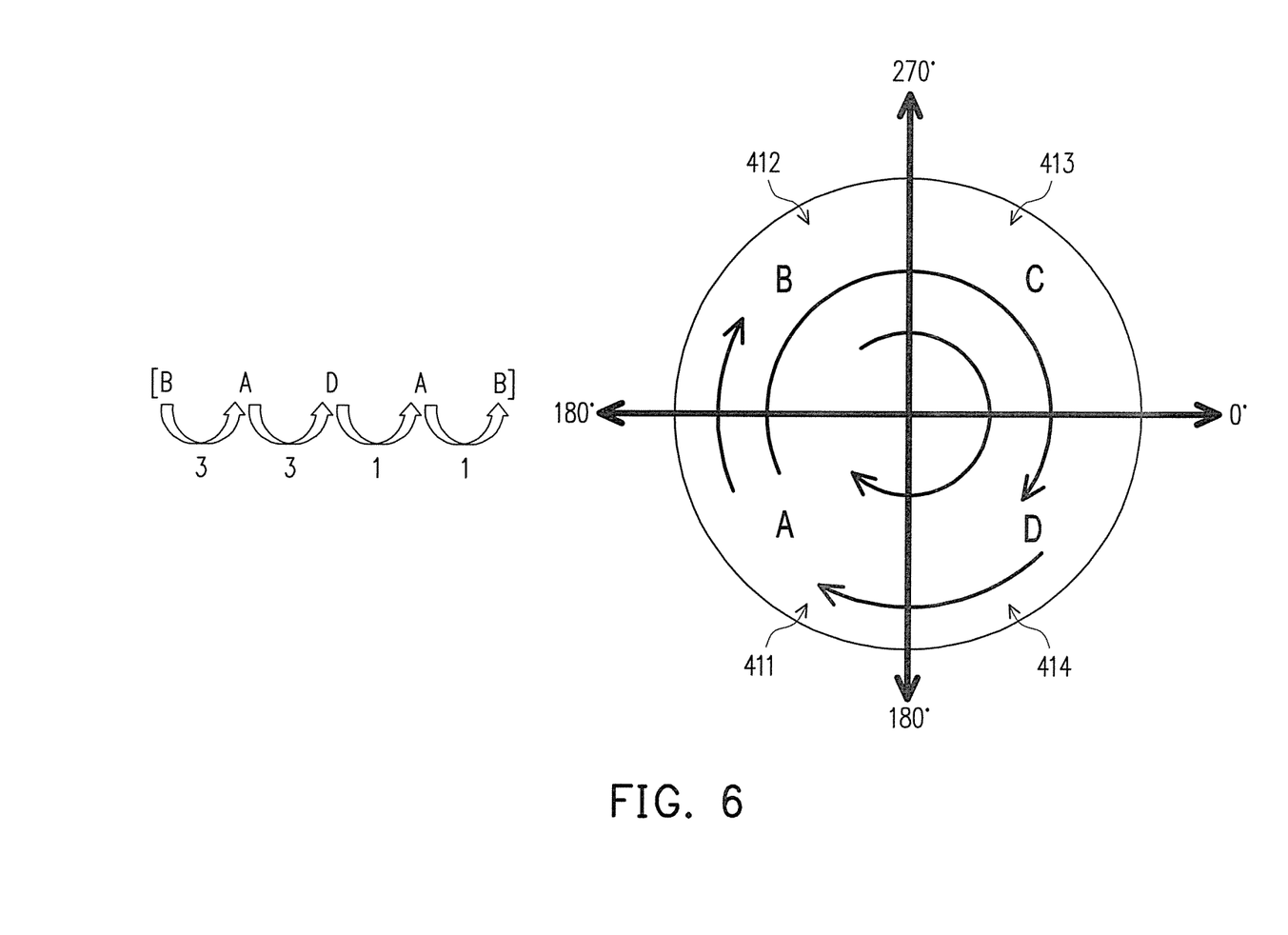
FIG. 6 is a schematic diagram illustrating a string generated by converting a code sequence according to an embodiment of the disclosure.

FIG. 6 is a schematic diagram illustrating a string generated by converting a code sequence according to an embodiment of the disclosure. Referring to FIG. 2 to FIG. 6, the touch control circuit 2112 may further convert the first code sequence to the first string. The touch control circuit 2112 may convert every two consecutive codes to a corresponding number in the first string. As shown in FIG. 5 and FIG. 6, a code "A" comes after a code "B" means that the motion direction range is changed from the motion direction range 412 to the motion direction range 411. Every difference between two adjacent codes is converted to a corresponding number. For example, if two consecutive codes are determined as the same codes, the touch control circuit 2112 may generate the number 0 in response; if a code "A" comes after a code "B", the touch control circuit 2112 may generate the number 3 in response because the difference between the motion direction ranges is counted by clockwise direction. Therefore, the touch control circuit 2112 may convert the first code sequence described as "BBBBAAA . . . AADDD . . . DDAAA . . . AABBB" to the first string described as "000300 . . . 0300 . . . 0100 . . . 0100", where the first string can corresponded to an input symbol "S".

In the embodiment of the disclosure, the touch control circuit 2112 may compare the first string with a plurality of preconfigured strings corresponding to a plurality of preconfigured symbols so as to identify the input symbol. Specifically, the touch control circuit 2112 may convert the first string (including a plurality of decimal numbers) to a binary sequence, or further convert the binary sequence to a hexadecimal sequence by a data conversion. Then, the touch control circuit 2112 may compare the converted first string with a plurality of preconfigured strings corresponding to a plurality of preconfigured symbols through a look-up table (LUT), so as to identify the input symbol "S". In another embodiment of the disclosure, the touch control circuit 2112 may directly take the first code sequence described as "BBBBAAA . . . AADDD . . . DDAAA . . . AABBB" to compare to a plurality of preconfigured code sequence corresponding to a plurality of preconfigured symbols through the look-up table.

It is note that the data conversion from the first code sequence to the first string may be adapted for compressing data size because the preconfigured symbols are presented by a limited number of bits. The data conversion in the present disclosure is merely an example. In still another one embodiment of the disclosure, the touch control circuit 2112 may simplify the first code sequence to a second code sequence described as "BADAB" by reducing the adjacent and identical codes. The touch control circuit 2112 may convert the second code sequence described as "BADAB" to the second string described as "3311". Then, the touch control circuit 2112 may convert the second string described as "3311" to a binary sequence described as "11 11 01 01", or further convert the binary sequence to a hexadecimal sequence described as "0Xf5" by a data conversion. Then, the touch control circuit 2112 may compare the second string with a plurality of preconfigured strings corresponding to a plurality of preconfigured symbols through a look-up table (LUT), so as to identify the input symbol "S". Therefore, the amount of data of the look-up table can be effective reduced.

However, in other embodiments of the disclosure, the touch control circuit 2112 may compare one or more features of an image of the input symbol with images of a plurality of preconfigured symbols so as to identify the input symbol, where the one or more features may include vertices and three turning points. Specifically, the touch control circuit 2112 may continuously record the touch coordinates 510_1 to 510_N as shown in FIG. 5 to compare the relative positions of the input symbol with the preconfigured symbols. In other words, the touch control circuit 2112 may compare the image feature values of the input symbol with the actual characters of the preconfigured symbols to confirm the characters with a high degree of matching. For example, due to the letter "W" have two vertices and three turning points, where the two vertices and the second turning point will fall on the same side of the writing range, and the other two turning points will fall on the other side. Therefore, the touch control circuit 2112 may compare the input symbol with the preconfigured symbols according to the order and the number of the vertices and the turning points. Alternatively, in other embodiments of the disclosure, the touch control circuit 2112 may directly compare a complete image of the input symbol drawn on the touch display screen with preconfigured images of a plurality of preconfigured symbols so as to identify the input symbol.

In addition, in other embodiments of the disclosure, the touch control circuit 2112 may utilize the predicted path principle to reduce a search range in the preconfigured symbols according to a part of strokes of the input symbol. Specifically, the touch control circuit 2112 may convert some of the plurality of vectors regarding to beginning strokes of the input symbol to a second string. The amount of data of the second string is less than the amount of data of the first string corresponding to the complete input symbol. For example, if the touch control circuit 2112 determines that the very first stroke of the input symbol has the upward direction (according to a plurality of vectors regarding to the first stroke) and the second stroke of the input symbol has a left-downward direction (according to a plurality of vectors regarding to the second stroke), the touch control circuit 2112 may not consider the possibility of the letter "Z", "M" and other letters, and the possibility of the letter "V", "W", "S" and other letters is increased. Furthermore, the touch control circuit 2112 may ignore impossible symbols from the set of preconfigured symbols according to the subsequent strokes.

In summary, according to the touch driving device and the touch movement track identification method of the disclosure, during the touch display screen operating in the display power saving mode and the core processing unit of the electronic device operating in the sleep mode, the touch driving device is capable of effectively identifying the touch movement track even the orientation of the input symbol is not the same as the screen orientation of the touch display screen, so as to determine whether to wake up the core processing unit to operate related applications according to the identification result of the input symbol.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch driving device for driving a touch sensor array of a touch display screen of an electronic device, wherein the touch driving device comprises:

a touch sensing circuit, configured to receive a plurality of touch sensing signals from the touch sensor array when the touch display screen is operated in a display power saving mode, and generate a plurality of digital touch sensing data according to the plurality of touch sensing signals, a touch control circuit, coupled to the touch sensing circuit, and configured to periodically generate a plurality of touch coordinates according to the plurality of digital touch sensing data, identify whether an input symbol corresponding to a touch movement track formed by the plurality of touch coordinates generated consecutively matches a preconfigured symbol, and output a matching result to a core processing unit of the electronic device, wherein the plurality of touch coordinates are generated when an orientation of the input symbol drawn on the touch display screen is not the same as a screen orientation of the touch display screen, wherein the touch control circuit is configured to obtain a plurality of vectors according to each two time-adjacent touch coordinates of the plurality of touch coordinates and generate a first code sequence by converting each of the plurality of vectors to a code representing a motion direction range that each vector falls in according to an angle between the each vector and a reference axis, wherein the first code sequence is used for identifying the input symbol.

2. The touch driving device as claimed in claim 1, wherein the touch control circuit is configured to convert the first code sequence to a first string and compare the first string with a plurality of strings corresponding to a plurality of preconfigured symbols so as to identify the input symbol.

3. The touch driving device as claimed in claim 2, wherein each code in the first code sequence are selected from a plurality of candidate codes representing different motion direction ranges.

4. The touch driving device as claimed in claim 1, wherein the touch control circuit is configured to compare one or more features of an image of the input symbol with images of a plurality of preconfigured symbols so as to identify the input symbol.

5. The touch driving device as claimed in claim 1, wherein the touch control circuit is configured reduce a search range in a plurality of preconfigured symbols according to a part of strokes of the input symbol.

6. The touch driving device as claimed in claim 1, wherein the touch control circuit is configured to compare an image of the input symbol drawn on the touch display screen with images of a plurality of preconfigured symbols so as to identify the input symbol.

7. The touch driving device as claimed in claim 1, further comprises a display driving circuit for driving a plurality of display pixels of the touch display screen.

8. The touch driving device as claimed in claim 1, wherein the touch display screen does not display any image or displays only pre-stored images at the display power saving mode.

9. The touch driving device as claimed in claim 1, wherein the plurality of touch coordinates are generated when the core processing unit of the electronic device is operated in a sleep mode.

10. The touch driving device as claimed in claim 1, wherein the input symbol is composed of a plurality of continuous strokes.

11. A touch movement track identification method, comprising:
- receiving a plurality of touch sensing signals from a touch sensor array when a touch display screen is operated in a display power saving mode;
- generating a plurality of digital touch sensing data according to the plurality of touch sensing signals;
- periodically generating a plurality of touch coordinates according to the plurality of digital touch sensing data;
- identifying whether an input symbol corresponding to a touch movement track formed by the plurality of touch coordinates generated consecutively matches a preconfigured symbol; and
- outputting a matching result to a core processing unit of an electronic device,
- wherein the plurality of touch coordinates are generated when an orientation of the input symbol drawn on the touch display screen is not the same as a screen orientation of the touch display screen,
- wherein the identifying whether the input symbol matches the preconfigured symbol comprising:
- obtaining a plurality of vectors according to each two time-adjacent touch coordinates of the plurality of touch coordinates; and
- generating a first code sequence by converting each of the plurality of vectors to a code representing a motion direction range that each vector falls in according to an angle between the each vector and a reference axis,
- wherein the first code sequence is used for identifying the input symbol.

12. The touch movement track identification method as claimed in claim 11, wherein the identifying whether the input symbol matches the preconfigured symbol comprising:
- converting the first code sequence to a first string; and
- comparing the first string with a plurality of strings corresponding to a plurality of preconfigured symbols so as to identify the input symbol.

13. The touch movement track identification method as claimed in claim 12,
- wherein each code in the first code sequence are selected from a plurality of candidate codes representing different motion direction ranges.

14. The touch movement track identification method as claimed in claim 11, wherein the identifying whether the input symbol matches the preconfigured symbol comprising:
- comparing one or more features of an image of the input symbol with images of a plurality of preconfigured symbols so as to identify the input symbol.

15. The touch movement track identification method as claimed in claim 11, further comprising:
- reducing a search range in a plurality of preconfigured symbols according to a part of strokes of the input symbol.

16. The touch movement track identification method as claimed in claim 11, wherein the identifying whether the input symbol matches the preconfigured symbol comprising:
- comparing an image of the input symbol drawn on the touch display screen with images of a plurality of preconfigured symbols so as to identify the input symbol.

17. The touch movement track identification method as claimed in claim 11, wherein the touch display screen does not display any image or displays only pre-stored images at the display power saving mode.

18. The touch movement track identification method as claimed in claim 11, wherein the plurality of touch coordinates are generated when the core processing unit of the electronic device is operated in a sleep mode.

19. The touch movement track identification method as claimed in claim 11, wherein the input symbol is composed of a plurality of continuous strokes.

* * * * *